(12) United States Patent
Braun et al.

(10) Patent No.: US 11,761,397 B2
(45) Date of Patent: Sep. 19, 2023

(54) METHOD AND DEVICE FOR CHECKING THE STATE OF THE OUTLET VALVES OF AN ENGINE OF A MOTOR VEHICLE

(71) Applicant: Vitesco Technologies GmbH, Regensburg (DE)

(72) Inventors: Tobias Braun, Munich (DE); Jürgen Dingl, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/631,673

(22) PCT Filed: Jul. 28, 2020

(86) PCT No.: PCT/EP2020/071231
§ 371 (c)(1),
(2) Date: Jan. 31, 2022

(87) PCT Pub. No.: WO2021/018875
PCT Pub. Date: Feb. 4, 2021

(65) Prior Publication Data
US 2022/0275766 A1    Sep. 1, 2022

(30) Foreign Application Priority Data
Aug. 1, 2019   (DE) ..................... 10 2019 211 495.4

(51) Int. Cl.
*F02D 41/22*   (2006.01)
*F02D 13/02*   (2006.01)
(Continued)

(52) U.S. Cl.
CPC ......... *F02D 41/22* (2013.01); *F02D 13/0242* (2013.01); *F02D 13/06* (2013.01);
(Continued)

(58) Field of Classification Search
CPC .... F02D 41/22; F02D 13/0242; F02D 41/029; F02D 2041/0012; F02D 2200/0406;
(Continued)

(56) References Cited

U.S. PATENT DOCUMENTS 5,721,375 A * 2/1998 Bidner ................ F02D 41/0087
701/101
6,499,470 B2 * 12/2002 Takagi ..................... F02D 17/02
123/481

(Continued)

FOREIGN PATENT DOCUMENTS

| CN | 102023071 A | 4/2011 | ............ F02D 21/08 |
| DE | 10 2007 013 250 | 9/2008 | ............ F02D 41/22 |

(Continued)

OTHER PUBLICATIONS

Search Report for International Application No. PCT/EP2020/071231, 13 pages, dated Oct. 13, 2020.
(Continued)

*Primary Examiner* — Sizo B Vilakazi
*Assistant Examiner* — Brian R Kirby
(74) *Attorney, Agent, or Firm* — Slayden Grubert Beard PLLC

(57) ABSTRACT

Various embodiments of the teachings herein include methods for operating a motor vehicle having combustion chambers. The methods may include: closing the combustion chambers of the motor vehicle towards the exhaust tract by bringing outlet valves of the combustion chambers into the closed state; checking whether the outlet valves of the combustion chambers of the motor vehicle are in a closed state by evaluating the pressure prevailing in an intake pipe of the motor vehicle; and in the event one or more of the outlet valves are not in a closed state, initiating countermeasures to comply with emissions protocols.

9 Claims, 2 Drawing Sheets

(51) Int. Cl.
    *F02D 41/02*     (2006.01)
    *F02D 13/06*     (2006.01)
    *F02D 41/12*     (2006.01)
    *F02D 41/00*     (2006.01)
    *F01L 13/00*     (2006.01)

(52) U.S. Cl.
    CPC ......... *F02D 41/029* (2013.01); *F02D 41/123* (2013.01); *F01L 13/0005* (2013.01); *F01L 2800/11* (2013.01); *F01L 2820/043* (2013.01); *F02D 41/0087* (2013.01); *F02D 2041/0012* (2013.01); *F02D 2200/0406* (2013.01)

(58) Field of Classification Search
    CPC .... F02D 13/06; F02D 41/0087; F02D 41/123; F01L 2800/11; F01L 2820/043; F01L 2820/01; F01L 13/0005
    USPC .......................... 701/114; 73/114.37, 114.79
    See application file for complete search history.

(56) References Cited

U.S. PATENT DOCUMENTS

| | | | | |
|---|---|---|---|---|
| 7,762,237 B2 * | 7/2010 | Gibson | ............... | G01M 15/042 |
| | | | | 123/481 |
| 7,921,709 B2 * | 4/2011 | Doering | ................ | F02D 41/221 |
| | | | | 73/114.37 |
| 8,006,670 B2 * | 8/2011 | Rollinger | ............... | F02D 41/221 |
| | | | | 123/481 |
| 8,286,471 B2 * | 10/2012 | Doering | ............. | F02D 41/0087 |
| | | | | 73/114.79 |
| 8,667,835 B2 * | 3/2014 | Doering | ............. | F02D 41/0087 |
| | | | | 73/114.79 |
| 9,109,520 B2 * | 8/2015 | Nakagawa | .......... | F02D 41/0002 |
| 10,704,463 B2 * | 7/2020 | Iannone | ................ | F02D 41/221 |
| 2006/0243040 A1 * | 11/2006 | Reed | ........................ | F01L 9/20 |
| | | | | 73/114.79 |
| 2008/0229817 A1 | 9/2008 | Hartmann | ................... | 73/114.79 |
| 2008/0236267 A1 * | 10/2008 | Hartmann | ............. | F02D 41/221 |
| | | | | 73/114.37 |
| 2009/0204283 A1 * | 8/2009 | Roberts | ............... | F01L 13/0015 |
| | | | | 701/31.4 |
| 2010/0175462 A1 | 7/2010 | Doering et al. | ........... | 73/114.31 |
| 2010/0175463 A1 * | 7/2010 | Doering | ................ | F02D 41/221 |
| | | | | 73/114.37 |
| 2011/0125427 A1 | 5/2011 | Tugnolo et al. | ................. | 702/50 |
| 2011/0137509 A1 * | 6/2011 | Sarac | .................... | F02D 41/221 |
| | | | | 73/114.37 |
| 2014/0245823 A1 * | 9/2014 | Melzig | ................ | G01M 15/106 |
| | | | | 73/114.76 |
| 2016/0290246 A1 | 10/2016 | Park | ........................ | F02D 17/02 |
| 2017/0130664 A1 | 5/2017 | Rueger | ................. | F02D 41/222 |
| 2017/0198649 A1 * | 7/2017 | Kainz | ................. | F02D 13/0219 |
| 2017/0356370 A1 * | 12/2017 | Doering | ................... | F02D 17/02 |
| 2019/0033170 A1 * | 1/2019 | Dudar | ................. | G01M 15/106 |
| 2019/0249618 A1 * | 8/2019 | Dudar | ................ | F01L 13/0005 |

FOREIGN PATENT DOCUMENTS

| | | | | |
|---|---|---|---|---|
| DE | 10 2007 013 252 | | 9/2008 | ............. F02D 41/22 |
| DE | 10 2008 001 099 | | 10/2009 | ............. F02D 41/22 |
| DE | 102013212232 A1 | | 12/2014 | ............. F02D 41/22 |
| DE | 11 2014 005211 | | 8/2016 | ............. F02D 17/02 |
| DE | 10 2015 221 786 | | 5/2017 | ............. F02D 41/22 |
| JP | 2000073792 A | * | 3/2000 | ......... F02D 13/0226 |
| WO | 2012 077230 | | 6/2012 | ............. F02D 45/00 |
| WO | WO-2012077230 A1 | * | 6/2012 | ......... F02D 13/0226 |
| WO | WO-2015179119 A1 | * | 11/2015 | ............. F02D 13/06 |

OTHER PUBLICATIONS

Search Report for DE Application No. 10 2019 211 495.4, 6 pages, dated May 6, 2020.

Chinese Office Action, Application No. 202080054883.8, 7 pages, dated Apr. 15, 2023.

* cited by examiner

METHOD AND DEVICE FOR CHECKING THE STATE OF THE OUTLET VALVES OF AN ENGINE OF A MOTOR VEHICLE

CROSS-REFERENCE TO RELATED APPLICATIONS

This application is a U.S. National Stage Application of International Application No. PCT/EP2020/071231 filed Jul. 28, 2020, which designates the United States of America, and claims priority to DE Application No. 10 2019 211 495.4 filed Aug. 1, 2019, the contents of which are hereby incorporated by reference in their entirety.

TECHNICAL FIELD

The present disclosure relates to internal combustion engines. Various embodiments of the teachings herein may include methods and/or devices for checking the state of the outlet valves of the engine of a motor vehicle.

BACKGROUND

Motor vehicles often include a particulate filter in the exhaust gas system to comply with prescribed emission regulations. Such particulate filters have a higher filter efficiency when they are loaded with soot than when they are not loaded with soot.

One operating state of a motor vehicle is called an overrun operation. In such overrun operation, the particulate filter of the motor vehicle is usually supplied with oxygen. This leads to the soot which has accumulated in the particulate filter being burnt off, that is to say to regeneration of the particulate filter. After this regeneration, the particulate filter consequently has a lower efficiency than in the loaded state.

SUMMARY

The teachings of the present disclosure include methods and devices for operating a motor vehicle having combustion chambers, in which the state of the outlet valves of the engine can be checked. For example, some embodiments include a method for operating a motor vehicle having combustion chambers including: closing the combustion chambers of the motor vehicle towards the exhaust tract by bringing outlet valves of the combustion chambers into the closed state, and checking whether the outlet valves of the combustion chambers of the motor vehicle are in a closed state by evaluating the pressure prevailing in an intake pipe of the motor vehicle.

In some embodiments, the check whether the outlet valves of the combustion chambers of the motor vehicle are in the closed state is carried out by evaluating the pressure profile prevailing in the intake pipe of the motor vehicle.

In some embodiments, a mean pressure level is determined from the pressure profile prevailing in the intake pipe of the motor vehicle and is compared with a stored mean pressure level for normal operation of the motor vehicle.

In some embodiments, in the evaluation of the pressure profile prevailing in the intake pipe of the motor vehicle, the peak pressure values of the pressure profile are determined and compared with stored peak pressure values for normal operation of the motor vehicle.

In some embodiments, in the evaluation of the pressure profile prevailing in the intake pipe of the motor vehicle, the temporal position of the intake pipe pressure maxima and/or intake pipe pressure minima contained in the pressure profile, based in each case on the crankshaft angle, is determined and compared with stored values for the temporal position of the intake pipe pressure maxima and/or intake pipe pressure minima contained in the pressure profile, based in each case on the crankshaft angle, for normal operation.

In some embodiments, in the evaluation of the pressure profile prevailing in the intake pipe of the motor vehicle, it is determined in which of the combustion chambers the outlet valve is not in the closed state.

In some embodiments, in the case where the check reveals that at least one of the outlet valves is not in the closed state, a fault indication is outputted.

In some embodiments, in the case where the check reveals that at least one of the outlet valves is not in the closed state, an entry is made in a fault memory.

In some embodiments, the method is carried out in overrun operation of the motor vehicle.

As another example, some embodiments include a device for operating a motor vehicle having combustion chambers, characterized in that it has a control unit which is designed to control a method as claimed in one of the preceding claims.

In some embodiments, the device has an exhaust tract containing a particulate filter.

BRIEF DESCRIPTION OF THE DRAWINGS

The teachings herein are explained below by way of example using the drawings. In the figures.

DETAILED DESCRIPTION

Figure 1:
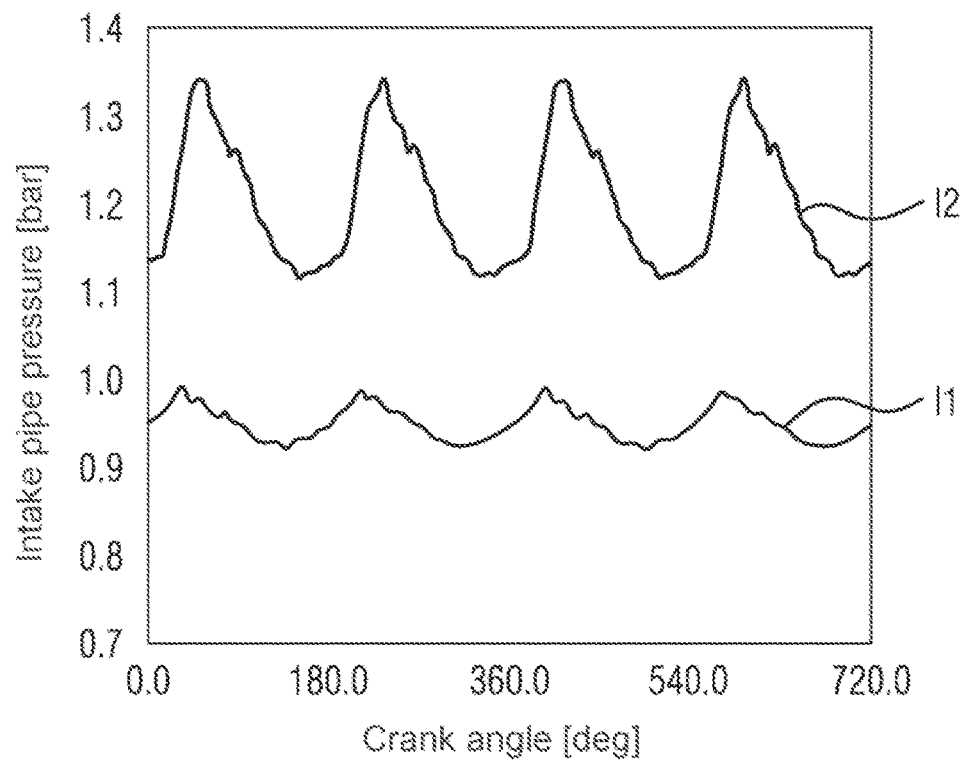
FIG. 1 shows diagrams which illustrate the pressure profile in the intake pipe of the motor vehicle in normal operation and with the outlet valves closed.

In some embodiments, there is a method for operating a motor vehicle having combustion chambers, in which the combustion chambers of the motor vehicle are brought towards the exhaust tract by bringing the outlet valves of the combustion chambers into the closed state, and it is checked whether the outlet valves of the combustion chambers of the motor vehicle are in the closed state by evaluating the pressure prevailing in the intake pipe of the motor vehicle.

Accordingly, it is checked whether the outlet valves of the combustion chambers are actually closed or not. This check takes place by evaluating the pressure prevailing in the intake pipe of the motor vehicle. This check has the effect that, in the case where one or more of the outlet valves of the combustion chambers are not closed, a corresponding fault indication can be outputted and/or an entry can be made in a fault memory as soon as possible, in order that remedial action is taken so that existing emission regulations can be met.

The check whether the outlet valves of the combustion chambers of the motor vehicle are in the closed state may be carried out by evaluating the pressure profile prevailing in the intake pipe of the motor vehicle.

In some embodiments, a mean pressure level is determined from the pressure profile prevailing in the intake pipe of the motor vehicle and is compared with a stored mean pressure level for normal operation of the motor vehicle.

In some embodiments, in the evaluation of the pressure profile prevailing in the intake pipe of the motor vehicle, the peak pressure values of the pressure profile are determined and compared with stored peak pressure values for normal operation of the motor vehicle.

In some embodiments, in the evaluation of the pressure profile prevailing in the intake pipe of the motor vehicle, the temporal position of the intake pipe pressure maxima and/or intake pipe pressure minima contained in the pressure profile, based in each case on the crankshaft angle, is determined and compared with stored values for the temporal position of the intake pipe pressure maxima and/or intake pipe pressure minima contained in the pressure profile, based in each case on the crankshaft angle, for normal operation.

In some embodiments, in the evaluation of the pressure profile prevailing in the intake pipe of the motor vehicle, it is determined in which of the combustion chambers the outlet valve is not in the closed state.

In some embodiments, in the case where the check reveals that at least one of the outlet valves is not in the closed state, a fault indication is outputted and/or an entry is made in a fault memory.

In some embodiments, the method is carried out in overrun operation of the motor vehicle, which has a particulate filter. By bringing the outlet valves of the combustion chambers of the motor vehicle into the closed state, regeneration of the particulate filter is prevented from taking place in the mentioned overrun operation. By bringing the outlet valves of the combustion chambers of the motor vehicle into the closed state in this way, the combustion chambers are closed towards the exhaust tract. This has the result that no more oxygen can be conveyed to the particulate filter. Furthermore, by the mentioned deactivation of the outlet valves, cooling down of the catalytic converter further provided in the exhaust gas system of the motor vehicle is avoided. In addition, oxygen is also prevented from being introduced into a catalytic converter further provided in the exhaust tract, whereby enrichment of the fuel-air mixture when the combustion process is next restarted can be dispensed with. An emission of carbon dioxide is thereby advantageously saved or reduced.

In some embodiments, a device for operating a motor vehicle having combustion chambers has a control unit which is designed to control the method according to the invention.

In some embodiments, this device has an exhaust tract containing a particulate filter.

FIG. 1 shows diagrams which illustrate the pressure profile in the intake pipe of a motor vehicle incorporating teachings of the present disclosure. Line 11 shows the pressure profile in the intake pipe of the motor vehicle in normal operation of the motor vehicle, in which in overrun operation both the inlet valves and the outlet valves are actuated. By contrast, line 12 illustrates the pressure profile in the intake pipe of the motor vehicle in overrun operation of the motor vehicle with the outlet valves deactivated, that is to say with the outlet valves permanently closed, while the inlet valves continue to be actuated.

If a mean pressure level is determined from each of the pressure profiles shown, it will be seen that the mean pressure level present in the intake pipe in the exemplary embodiment shown is about 0.95 bar in normal operation, while the mean pressure level present in the intake pipe with the outlet valves deactivated is about 1.25 bar. If the mean pressure level present in normal operation is determined empirically and this empirically determined mean pressure level is stored in a memory, the mean pressure level with the outlet valves deactivated can be determined during overrun operation of the motor vehicle and, by comparing the stored mean pressure level with the determined mean pressure level, it can be identified whether the outlet valves are actually in the closed state or whether that is not the case. If that is not the case, a fault indication can be outputted and/or an entry can be made in a fault memory. On the basis of this outputting of the fault signal or the entry in the fault memory, suitable countermeasures can be taken, for example the replacement of a faulty outlet valve.

In some embodiments, in the evaluation of the pressure profile prevailing in the intake pipe of the motor vehicle, the peak pressure values of the pressure profile are determined and compared with stored peak pressure values for normal operation of the motor vehicle.

If a peak pressure value is determined from each of the pressure profiles shown, it will be seen that the peak pressure value present in the intake pipe in the exemplary embodiment shown is about 1.00 bar in normal operation, while the peak pressure value present in the intake pipe with the outlet valves deactivated is about 1.35 bar. If the peak pressure value present in normal operation is determined empirically and this empirically determined peak pressure value is stored in a memory, the peak pressure value with the outlet valves deactivated can be determined during overrun operation of the motor vehicle and, by comparing the stored peak pressure value with the determined peak pressure value, it can be identified whether the outlet valves are actually in the closed state or whether that is not the case. If that is not the case, a fault indication can be outputted and/or an entry can be made in a fault memory. On the basis of this outputting of the fault signal or the entry in the fault memory, suitable countermeasures can be taken, for example the replacement of a faulty outlet valve.

In some embodiments, in the evaluation of the pressure profile prevailing in the intake pipe of the motor vehicle, the temporal position of the intake pipe pressure maxima and/or intake pipe pressure minima contained in the pressure profile, based in each case on the crankshaft angle, is determined and compared with stored values for the temporal position of the intake pipe pressure maxima and/or intake pipe pressure minima contained in the pressure profile, based in each case on the crankshaft angle, for normal operation.

It can be seen from FIG. 1, by comparing lines 11 and 12, that the position of the intake pipe pressure maxima and the position of the intake pipe pressure minima, based in each case on the crankshaft angle, are different.

Consequently, if the intake pipe pressure maxima and/or intake pipe pressure minima present in normal operation are determined empirically and the position thereof, based on the crankshaft angle, is stored in a memory, the corresponding values with the outlet valves deactivated can be determined during overrun operation of the motor vehicle and, by comparing the mentioned relative positions, it can be identified whether the outlet valves are actually in the closed state or whether that is not the case. If that is not the case, a fault indication can be outputted and/or an entry can be made in a fault memory. On the basis of this outputting of the fault signal or the entry in the fault memory, suitable countermeasures can be taken, for example the replacement of a faulty outlet valve.

The above-described general rise in the intake pipe pressure, the increase in the amplitudes of the intake pipe pressure and the shift of the intake pipe pressure maxima and intake pipe pressure minima, based on the crankshaft angle, result from the fact that the load enclosed in the combustion chambers is not, as in normal operation, pushed into the exhaust tract via the outlet valves but is first compressed in the exhaust cycle and, on opening of the inlet valve, flows into the intake tract of the engine. On the basis of this pressure rise, the amplitude increase and the position of the pressure maxima or pressure minima, it can accordingly be checked whether—as desired—all the outlet valves have been deactivated or not.

Figure 2:
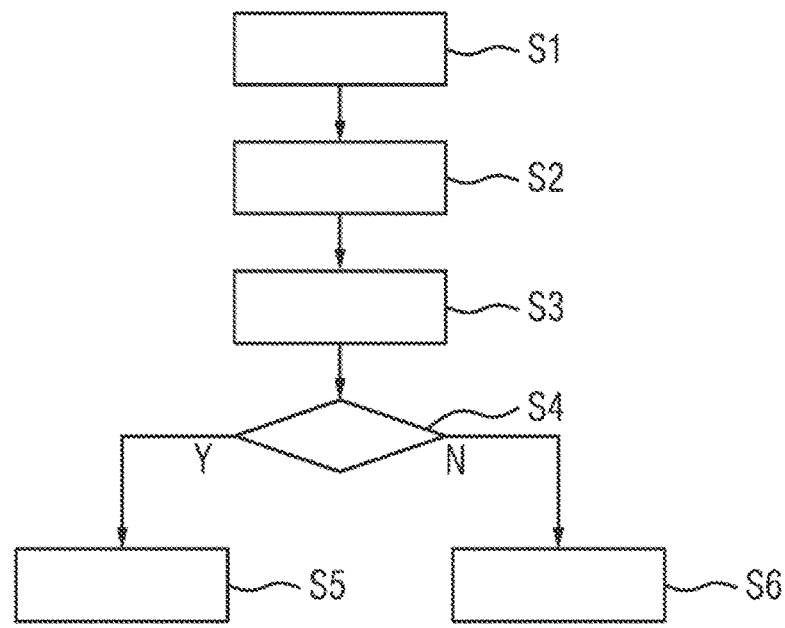
FIG. 2 shows a flow diagram of a method for checking the state of the outlet valves of an engine of a motor vehicle incorporating teachings of the present disclosure.

FIG. 2 shows a flow diagram of a method for checking the state of the outlet valves of an engine of a motor vehicle incorporating teachings of the present disclosure.

In this method, in a step S1 a mean intake pipe pressure level in normal operation is determined and this mean intake pipe pressure level is stored in a memory.

In a subsequent step S2, the outlet valves are deactivated in overrun operation of the motor vehicle.

In a subsequent step S3, after the outlet valves have been deactivated, the intake pipe pressure is detected and the mean intake pipe pressure level is determined.

Thereafter, in a step S4, the mean intake pipe pressure level determined and stored in step S1 is compared with the mean intake pipe pressure level determined in step S3 and it is queried whether, by means of the comparison carried out, an intake pipe pressure rise can be ascertained or not.

If such a pressure rise can be ascertained, it is identified in a step S5 that the deactivation of the outlet valves which has been carried out was successful. In this case, no further measures are required.

If, on the other hand, such a pressure rise cannot be ascertained, it is identified in a step S6 that the deactivation of the outlet valves which has been carried out was not successful and a fault indication is outputted and/or an entry is made in a fault memory. In response to this outputting of a fault indication or the mentioned entry in the fault memory, suitable countermeasures can be initiated in order to be able to comply with prescribed emission regulations.

In some embodiments, in which a rise in the mean intake pipe pressure level per se is used as the check criterion, an increase in the peak values of the intake pipe pressure profile or a shift of the intake pipe pressure maxima or of the intake pipe pressure minima can also be used as the check criterion.

In practical operation, it is also possible in overrun operation of a motor vehicle for faults to occur in consequence of which one or more outlet valves cannot be brought into the closed or deactivated state. This is explained in greater detail below with reference to FIG. 3.

Figure 3:
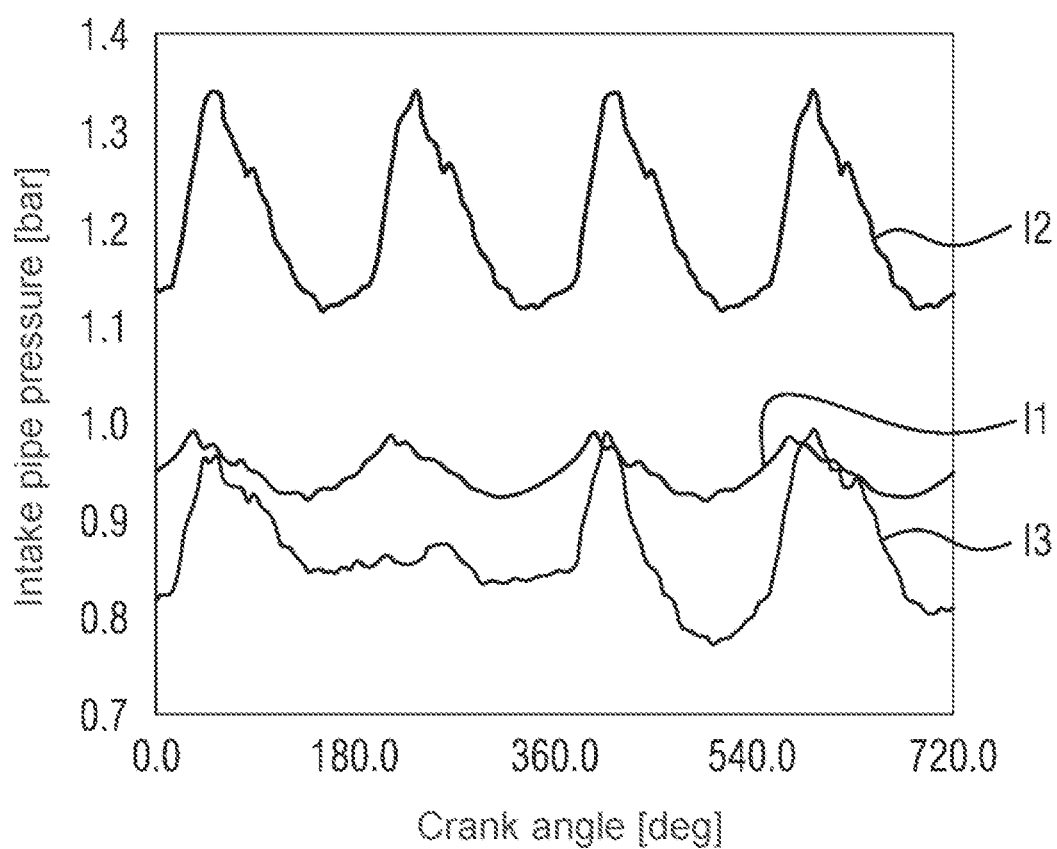
FIG. 3 shows diagrams which illustrate the pressure profile in the intake pipe of the motor vehicle in normal operation, with the outlet valves closed, and with some of the outlet valves closed in the case of a fault.

FIG. 3 shows diagrams which illustrate the pressure profile in the intake pipe of the motor vehicle in normal operation, with the outlet valves closed, and with some of the outlet valves closed in the case of a fault. Line 11 illustrates the pressure profile in the intake pipe of the motor vehicle in normal operation, line 12 illustrates the pressure profile in the intake pipe with the outlet valves closed, and line 13 illustrates the pressure profile in the intake pipe of the motor vehicle with some of the outlet valves closed in the case of a fault. In the case of this fault, only the outlet valves of combustion chambers 1, 3 and 4 have been deactivated on deactivation of the outlet valves, whereas the outlet valve of combustion chamber 2 continues to be actuated. This corresponds to the fault of faulty switching for combustion chamber 2.

It can thus be seen from FIG. 3 that, in the exemplary embodiment shown, the mean pressure level in the intake pipe in normal operation is about 0.95 bar, whereas this mean pressure level in the case of the mentioned fault is about 0.85 bar. On the basis of this difference in the mean pressure level, it can be identified that a fault is present.

By further analysis of the pressure profile it can additionally be ascertained in which combustion chamber this fault is present.

To this end, an evaluation of the intake pipe pressure peaks, for example, can be carried out.

Both in normal operation, as is illustrated by line 11, and when the outlet valves are deactivated completely, as is illustrated by line 12, there are 4 pressure peaks per combustion cycle (720° crankshaft angle). Between these pressure peaks there is in each case a crankshaft angle distance of about 180°. This corresponds to the conditions in a straight-four engine.

In the case of a fault, as is illustrated by line 13, there are only 3 pressure peaks. In the segment of the intake cycle of the combustion chamber 2, that is to say between 180° crankshaft angle and 360° crankshaft angle, there is no pressure peak, since here the outlet valve has been actuated and a backflow of the cylinder charge into the intake pipe—as in combustion chambers 1, 3 and 4—does not take place.

Detection of the combustion chamber in respect of which the fault is present can be carried out as follows:

One possibility consists in determining the number and the position of the pressure peaks that are present per 720° CA (CA=crankshaft angle). If there are fewer than 4 pressure peaks, the fault can be associated with a particular combustion chamber on the basis of the missing pressure peak in the intake segment.

A further possibility consists in determining the distance from pressure peak to pressure peak. If this distance is considerably greater than 180° CA, the associated combustion chamber has a fault.

Apart from these two possibilities, there are further possibilities for detecting the combustion chamber in respect of which there is a fault. For example, zero transitions can be evaluated, gradients can be evaluated, amplitude values can be evaluated, or the position of the pressure maxima or pressure minima can be evaluated.

In some embodiments, it is thus checked, by evaluating the intake pipe pressure, whether the outlet valves of the combustion chambers have been deactivated in the desired manner or whether that is not the case. The result of this check may be stored in a fault memory of the motor vehicle.

In some embodiments, this check can take place in overrun operation of a motor vehicle which has combustion chambers and an exhaust tract containing a particulate filter. In some embodiments, it can also be carried out in motor vehicles which do not have a particulate filter but are equipped with a device for deactivating the outlet valves. Furthermore, it can also be used in motor vehicles which do not have a device for deactivating the outlet valves. In such motor vehicles, it may be that an outlet valve of the engine no longer opens because a component has failed. This can also be detected by means of the methods described herein.

Further advantages of methods incorporating teachings of the present disclosure are inter alia that the methods and the devices require only hardware components that are already present, so that there are no costs for additional hardware. In particular, the intake pipe pressure can be detected using an intake pipe pressure sensor that is already present, the output signal of which is fed to a control unit which is already present and is designed for carrying out the methods. This control unit must simply be equipped with software suitable for controlling the claimed method.

What is claimed is:

1. A method for operating a motor vehicle having multiple combustion chambers, each with a respective outlet valve, the method comprising:
   closing all of the combustion chambers of the motor vehicle towards the exhaust tract at the same time by actuating each of the outlet valves of the combustion chambers toward a closed state;
   checking whether each of the outlet valves of the combustion chambers of the motor vehicle is in the respective closed state by evaluating the pressure prevailing in an intake pipe of the motor vehicle; and
   in the event one or more of the outlet valves are not in a closed state, initiating countermeasures to comply with emissions protocols;
   wherein evaluating the pressure prevailing in an intake pipe of the motor vehicle includes: determining the peak pressure values of the pressure profile; and comparing the determined peak pressure values with stored peak pressure values for normal operation of the motor vehicle.

2. The method as claimed in claim 1, further comprising:
   determining a mean pressure level from the pressure profile prevailing in the intake pipe of the motor vehicle; and
   comparing the mean pressure level with a stored mean pressure level for normal operation of the motor vehicle.

3. The method as claimed in claim 1, wherein evaluating the pressure profile prevailing in the intake pipe of the motor vehicle includes:
   determining a temporal position of the intake pipe pressure maxima and/or intake pipe pressure minima contained in the pressure profile, based in each case on the crankshaft angle; and
   comparing the determined temporal position with stored values for the temporal position of the intake pipe pressure maxima and/or intake pipe pressure minima contained in the pressure profile, based in each case on the crankshaft angle, for normal operation.

4. The method as claimed in claim 1, wherein evaluating the pressure profile prevailing in the intake pipe of the motor vehicle includes determining in which of the combustion chambers the outlet valve is not in the closed state.

5. The method as claimed in claim 1, further comprising, in the case where the check reveals that at least one of the outlet valves is not in the closed state, a fault indication is outputted.

6. The method as claimed in claim 1, further comprising, in the case where the check reveals that at least one of the outlet valves is not in the closed state, an entry is made in a fault memory.

7. The method as claimed in claim 1, wherein the method is carried out in overrun operation of the motor vehicle.

8. A device for operating a motor vehicle having combustion chambers, the device comprising a control unit programmed to:
   signal one or more actuators to close all of the combustion chambers of the motor vehicle towards the exhaust tract at the same time by bringing outlet valves of the combustion chambers into the closed state;
   check whether the outlet valves of the combustion chambers of the motor vehicle are in a closed state by evaluating the pressure prevailing in an intake pipe of the motor vehicle; and
   in the event one or more of the outlet valves are not in a closed state, initiate countermeasures to comply with emissions protocols;
   wherein evaluating the pressure prevailing in an intake pipe of the motor vehicle includes: determining the peak pressure values of the pressure profile; and comparing the determined peak pressure values with stored peak pressure values for normal operation of the motor vehicle.

9. The device as claimed in claim 8, further comprising an exhaust tract containing a particulate filter.

* * * * *